(No Model.)
G. W. LILLY.
SHOVEL FASTENER FOR CULTIVATORS.
No. 325,421. Patented Sept. 1, 1885.
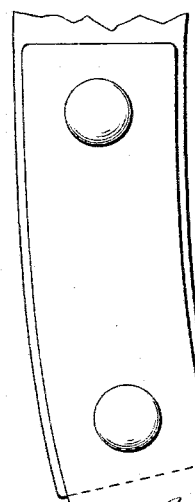
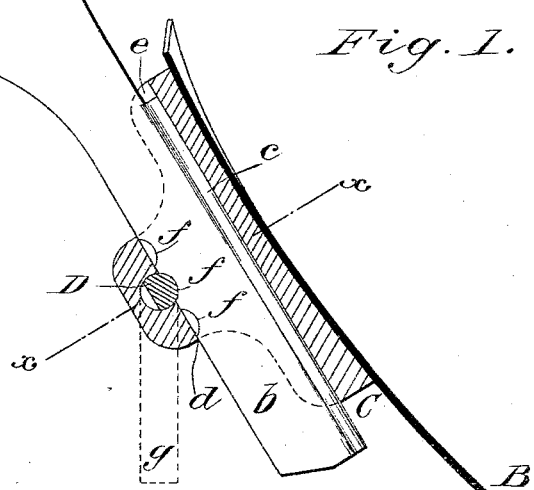
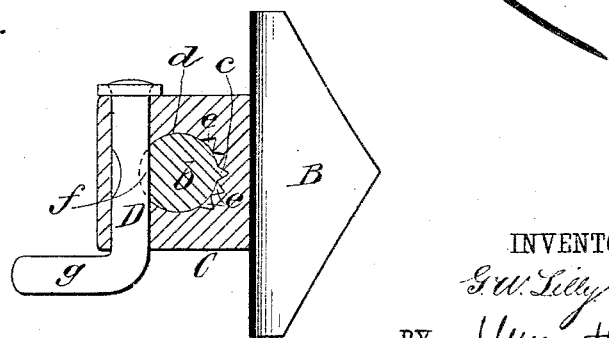
WITNESSES:
Johnes Deemer
C. Sedgwick
INVENTOR:
G. W. Lilly
BY Munn & Co.
ATTORNEYS.

UNITED STATES PATENT OFFICE.

GEORGE W. LILLY, OF CENTRE, MISSOURI.

SHOVEL-FASTENER FOR CULTIVATORS.

SPECIFICATION forming part of Letters Patent No. 325,421, dated September 1, 1885.

Application filed May 5, 1885. (No model.)

*To all whom it may concern:*

Be it known that I, GEORGE W. LILLY, of Centre, in the county of Ralls and State of Missouri, have invented certain new and useful Improvements in Shovel-Fasteners for Cultivators, of which the following is a full, clear, and exact description.

This invention relates to plow-shovel fasteners or shovel-fasteners for cultivators in which provision is made for adjusting the shovel to occupy different positions laterally, and also different depths; and it consists in novel fastening means for such purposes, substantially as hereinafter described and claimed.

Reference is to be had to the accompanying drawings, forming a part of this specification, in which similar letters of reference indicate corresponding parts in both the figures.

Figure 1 represents a mainly-sectional side view of my improved shovel-fastener with shovel attached, and Fig. 2 a cross-section of the same on the line $x$ $x$ in Fig. 1.

A indicates the standard or brake-pin attachment of a shovel-standard of the usual form at its upper end, and having a lower rounded end or shank, $b$, which is provided with a longitudinal rib or elongated cog, $c$.

B is the shovel, which may be of the usual or any suitable shape, and which is riveted onto the face of a fastening-carrier, C. This fastening-carrier is constructed with an eye or tubular socket, $d$, in rear of its face portion, to receive the shank $b$ freely through it, and so that said carrier may be adjusted up and down, also turned laterally thereon, to vary the depth of the shovel's insertion into the ground, and to change its position laterally or angularly in a lateral direction, as circumstances may require. In the tubular portion $d$ of the fastening-carrier C, extending up the back of the face part of the carrier, are a series (five, more or less) of longitudinal grooves, $e$, arranged side by side, and of corresponding transverse configuration as the rib or elongated cog $c$ on the shank $b$, to receive said rib or cog within them—that is, within any one of said grooves—according to the lateral set required to give the shovel. There are also a series of cross-grooves, $f$, in the shank $b$, arranged one above the other, for the reception of a cam or rod eccentric, D, when the same is suitably turned—say downward—so far as a crank or handle, $g$, with which it is provided, is concerned, to lock or hold the fastening-carrier C, with its attached shovel, at different depths, according to the particular cross-groove $f$ with which the cam is made to engage. Said cam, when adjusted into a locking position, as described, also serves, in conjunction with the rib or cog $c$ on the shank $b$, and the particular groove $e$ in the carrier within which said cog enters, to hold the fastening-carrier C and its attached shovel in their lateral or turned position on the shank in which they have been set.

Upon turning the cam or rod eccentric D into a reverse position to that shown for it in the drawings, it releases hold on the fastening-carrier by its disengagement from the cross-groove $f$ within which it was entered to lock the carrier on the shank of the standard.

Having thus fully described my invention, I claim as new and desire to secure by Letters Patent—

1. In a shovel-fastener for cultivators, the shank $b$ of the standard, provided with a longitudinal rib or elongated cog, $c$, in combination with the fastening shovel-carrier C, constructed with a tubular eye, and having a series of inner longitudinal grooves, $e$, adapted to fit said rib or cog, and the locking cam or rod eccentric D, substantially as specified.

2. The shank $b$, having a series of cross-grooves, $f$, arranged one above the other, in combination with the tubular fastening shovel-carrier C and the locking cam or rod eccentric D, essentially as described.

3. The combination, with the standard-shank $b$, having a longitudinal rib or elongated cog, $c$, and a series of cross-grooves, $f$, arranged one above the other, of the tubular fastening shovel-carrier C, having a series of longitudinal grooves adapted to fit said rib or cog, and the locking cam or rod eccentric D, for securing the carrier at different heights or depths and in different lateral positions on the shank $b$, substantially as shown and described.

GEORGE W. LILLY.

Witnesses:
  M. L. HULSE,
  N. A. FOSTER.